US012630682B2

(12) United States Patent
Kim et al.

(10) Patent No.: US 12,630,682 B2
(45) Date of Patent: May 19, 2026

(54) STACKED STRUCTURE FOR DISPLAY COVER WINDOW HAVING IMPROVED SCRATCH RESISTANCE USING DIFFERENCE IN ELASTIC MODULUS AND METHOD OF MANUFACTURING THE SAME

(71) Applicant: BCAM CO., LTD., Gyeonggi-do (KR)

(72) Inventors: Min Gi Kim, Seoul (KR); Jeong Ho An, Seoul (KR)

(73) Assignee: BCAM CO., LTD., Gyeonggi-do (KR)

( * ) Notice: Subject to any disclaimer, the term of this patent is extended or adjusted under 35 U.S.C. 154(b) by 696 days.

(21) Appl. No.: 17/299,801

(22) PCT Filed: May 7, 2020

(86) PCT No.: PCT/KR2020/006039
§ 371 (c)(1),
(2) Date: Jun. 4, 2021

(87) PCT Pub. No.: WO2021/225193
PCT Pub. Date: Nov. 11, 2021

(65) Prior Publication Data
US 2022/0306824 A1      Sep. 29, 2022

(51) Int. Cl.
C08J 7/046          (2020.01)
B05D 7/00           (2006.01)
            (Continued)

(52) U.S. Cl.
CPC .............. C08J 7/046 (2020.01); B05D 7/546 (2013.01); C08J 7/0427 (2020.01); C09J 7/29 (2018.01);
            (Continued)

(58) Field of Classification Search
CPC ...... C08J 7/046; C08J 7/0427; C08J 2333/12; G02B 1/14; B05D 7/546; C09J 7/29;
            (Continued)

(56) References Cited

U.S. PATENT DOCUMENTS

2015/0075710 A1*    3/2015   Lu ............................. C09J 5/00
                                                            522/18
2017/0087807 A1*    3/2017   Lee ......................... B32B 7/12
                             (Continued)

FOREIGN PATENT DOCUMENTS

| | | | |
|---|---|---|---|
| JP | 2008-095064 A | | 4/2008 |
| JP | 2014025061 A | * | 2/2014 |
| JP | 2015098123 A | * | 5/2015 |
| JP | 2018-529987 A | | 10/2018 |
| KR | 10-2004-0037081 A | | 5/2004 |
| KR | 10-1814469 B1 | | 1/2018 |
| KR | 10-2020-0052742 A | | 5/2020 |

OTHER PUBLICATIONS

English Language Translation of JP-2014025061-A (Year: 2014).*
English Language Translation of JP-2015098123-A (Year: 2015).*

*Primary Examiner* — Maria V Ewald
*Assistant Examiner* — Daniel P Dillon
(74) *Attorney, Agent, or Firm* — Studebaker Brackett PLLC

(57) ABSTRACT

The present disclosure relates to a stacked structure for a display cover window having improved scratch resistance using a difference in elastic modulus, and a method of manufacturing the same. The stacked structure for a display cover window includes a base member having an elastic modulus of 2.5 GPa to 5.5 GPa; a hard coating member disposed on the base member and having an elastic modulus of 0.546 times to 2.4 times the elastic modulus of the base member; and a damping member disposed beneath the base member and having an elastic modulus of 0.0000018 to 0.02 times the elastic modulus of the base member. The stacked structure for a display cover window has an effect of remarkably improving scratch resistance by reducing a normal force, which is a major component of frictional force that is a main cause of scratching.

6 Claims, 4 Drawing Sheets

| | |
|---|---|
| Hard coating member | 6.0μm ~ 8.3μm |
| Base member | PMMA / PET / TPU |
| Damping member | Silicon Adhesive (10μm / 20μm / 30μm / 40μm) |

(51) Int. Cl.
    *B32B 7/02*          (2019.01)
    *C08J 7/04*          (2020.01)
    *C09J 7/29*          (2018.01)
    *G02B 1/14*          (2015.01)

(52) U.S. Cl.
    CPC ............. *G02B 1/14* (2015.01); *C08J 2333/12*
        (2013.01); *C08J 2435/02* (2013.01); *C09J*
        *2203/318* (2013.01); *C09J 2301/122*
        (2020.08); *C09J 2301/162* (2020.08); *C09J*
        *2301/312* (2020.08); *C09J 2433/00* (2013.01);
        *C09J 2433/006* (2013.01); *C09J 2483/00*
        (2013.01)

(58) Field of Classification Search
    CPC ............ C09J 2203/318; C09J 2301/122; C09J
        2301/162; C09J 2301/312; C09J 2433/00;
        C09J 2433/006
    See application file for complete search history.

(56) References Cited

U.S. PATENT DOCUMENTS

| | | | |
|---|---|---|---|
| 2017/0120562 A1* | 5/2017 | Williams | ................ B32B 27/16 |
| 2017/0253707 A1* | 9/2017 | Lim | .......................... C08J 7/042 |
| 2018/0061893 A1* | 3/2018 | Breedlove | ............ H10K 77/111 |

\* cited by examiner

【FIG. 1】
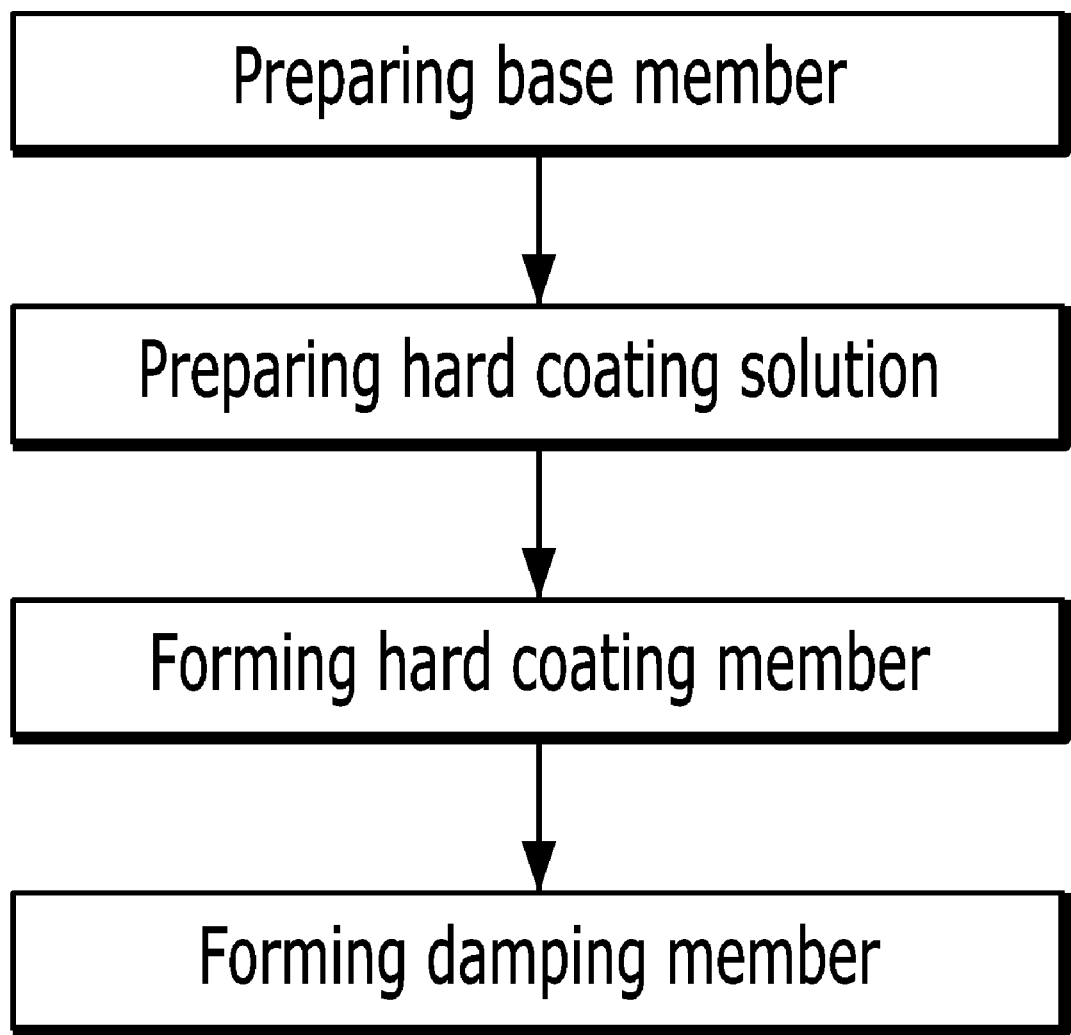

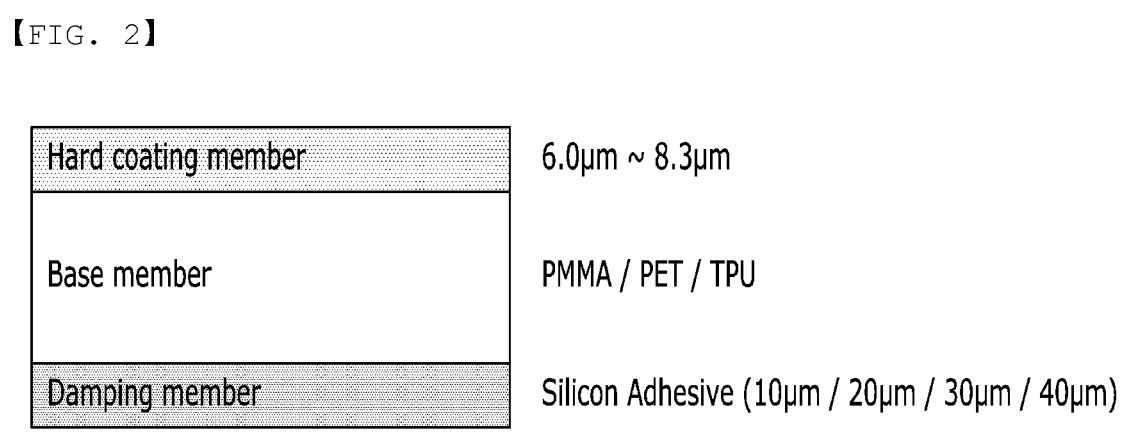

【FIG. 2】

| | |
|---|---|
| Hard coating member | 6.0μm ~ 8.3μm |
| Base member | PMMA / PET / TPU |
| Damping member | Silicon Adhesive (10μm / 20μm / 30μm / 40μm) |

【FIG. 3】
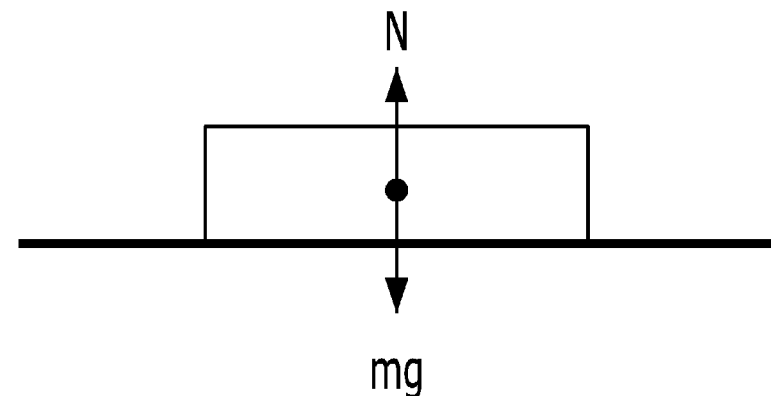
Value of normal force acting on horizontal plane
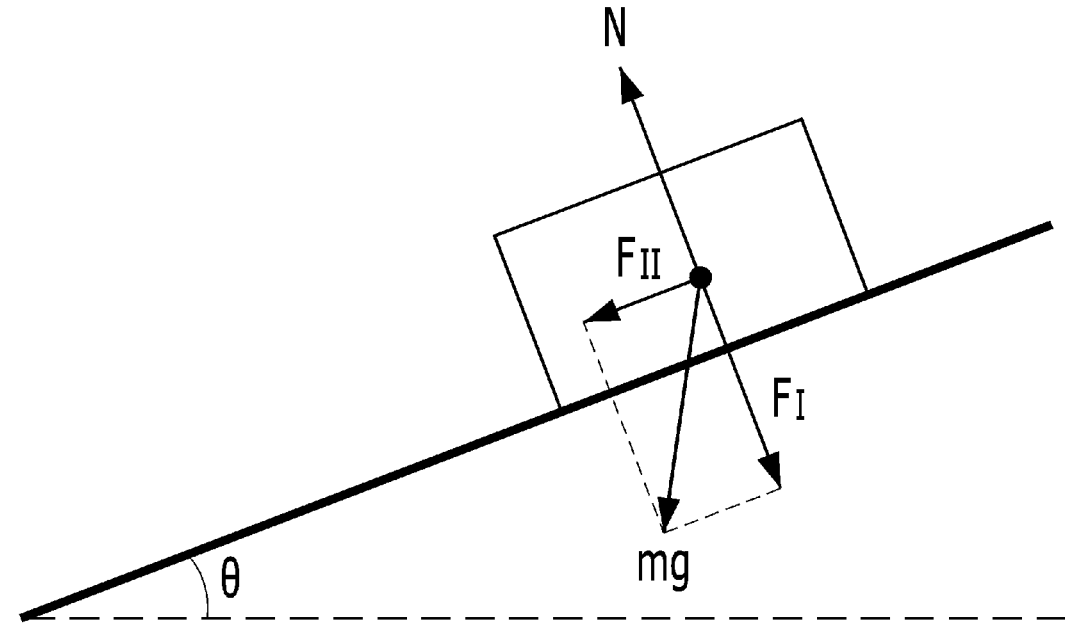
Value of normal force acting on slope 【FIG. 4】
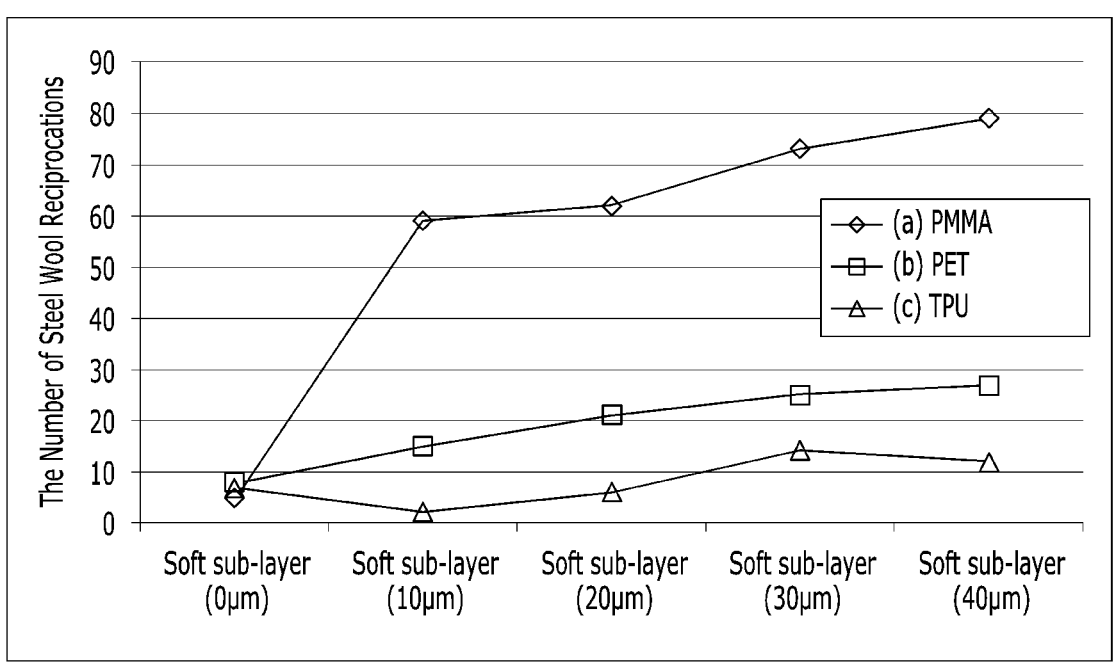

STACKED STRUCTURE FOR DISPLAY COVER WINDOW HAVING IMPROVED SCRATCH RESISTANCE USING DIFFERENCE IN ELASTIC MODULUS AND METHOD OF MANUFACTURING THE SAME

TECHNICAL FIELD

The present disclosure relates to a stacked structure for a display cover window having improved scratch resistance using a difference in elastic modulus and a method of manufacturing the same, and more particularly, to a stacked structure for a display cover window having improved scratch resistance using a difference in elastic modulus, in which scratch resistance is significantly improved by designing an interlayer structure of a stacked structure for a display cover window based on the difference in elastic modulus, and a method of manufacturing the same.

BACKGROUND ART

A cover window made of glass or plastic is installed on the surface of liquid crystal display devices such as PC monitors, televisions, and mobile phones. Also, in general, plastics are widely used in terms of excellent scattering prevention and impact resistance compared to tempered glass. However, plastic materials have a lower hardness than tempered glass and lack scratch resistance that usually occurs in everyday life.

In order to solve the problem of lower hardness, a study on a multilayer laminate using two or more types of materials rather than a single resin, has attracted great interest. As an example of the development of a multilayer laminate, a two-layer laminate manufactured by co-extraction using a conventional polycarbonate-based resin having high hardness and excellent transparency, impact resistance and moisture resistance as a raw material for a base layer, and a conventional acryl-based resin such as a copolymer of methyl methacrylate and styrene having excellent transparency as a raw material for a skin layer, or a copolymer of methyl methacrylate and acrylic acid ester having excellent transparency as a raw material for a skin layer, has been developed, and has been applied and used as a stacked structure for some smartphone cover windows due to its great advantage of being light weight and low cost compared to tempered glass. However, in such a conventional technique, the problem of hardness has been solved to some extent, but there is still a problem with the scratch resistance that scratches easily occur when using a smartphone under actual use conditions. As such, there are many inventions for improving hardness in the related art, but there has been no attempt to reduce scratch that may occur when actually using a smartphone by designing a stacked structure for a display cover window having improved scratch resistance using a difference in elastic modulus to reduce a normal force, which is a major component of the frictional force, and absorbing and dissipating some of external stress by a damping layer, because there is no problem recognition for the scratch resistance, which is a characteristic separate from hardness.

That is, the scratch resistance does not increase in proportion to the surface hardness, and thus the surface hardness and the scratch resistance are separate characteristics. Although surface hardness is generally improved when a hard coating is applied, but simply applying the hard coating does not result in a greatly improved effect on the scratch resistance. There is a limit to obtaining the desired scratch resistance only with such an improvement of the surface hardness. Thus, the present inventors have completed a stacked structure for a display cover window having improved scratch resistance using a difference in elastic modulus according to the present disclosure by designing an interlayer structure constituting a stacked structure for a display cover window using the difference in elastic modulus and studying a method of improving the scratch resistance properties.

DISCLOSURE

Technical Problem

The present disclosure has been made in an effort to solve the problems described above, and an object of the present disclosure is to provide a stacked structure for a display cover window capable of being used in various environments or devices and having improved scratch resistance using a difference in elastic modulus by designing the stacked structure for a display cover window having improved scratch resistance using the difference in elastic modulus to make a stacked structure for a display cover window having improved scratch resistance it possible to be formed even with a combination of various materials.

An another object of the present disclosure provides a stacked structure for a display cover window having improved scratch resistance using the difference in elastic modulus, in which a normal force, which is a main component of the frictional force that is a main cause of scratching, is reduced, and at the same time, a damping layer absorbs and dissipates some of external stress, so that the scratch resistance is significantly improved by designing the stacked structure for a display cover window having improved scratch resistance using the difference in elastic modulus.

Technical Solution

In one aspect, a stacked structure for a display cover window having improved scratch resistance using a difference in elastic modulus according to the present disclosure, includes a base member having an elastic modulus of 2.5 GPa to 5.5 GPa, a hard coating member disposed on the base member and having an elastic modulus of 0.546 times to 2.4 times the elastic modulus of the base member, and a damping member disposed beneath the base member and having an elastic modulus of 0.0000018 times to 0.02 times the elastic modulus of the base member.

In another aspect, a method of manufacturing a stacked structure for a display cover window having improved scratch resistance using a difference in elastic modulus according to the present disclosure includes the steps of: preparing a base member having an elastic modulus of 2.5 GPa to 5.5 GPa and a thickness of 101 μm to 1000 μm and made of poly(methyl methacrylate) (PMMA) materials, preparing a hard coating solution by dissolving a solid component containing 3 to 5 parts by weight of hexamethylene diisocyanate trimer (HDI-trimer), 20 to 24 parts by weight of pentaerythritol triacrylate (PETA), 10 to 15 parts by weight of nano-silica, 5 to 8 parts by weight of methyl methacrylate, 10 to 15 parts by weight of a curing agent, 0.1 to 0.5 parts by weight of a leveling agent and 1 to 2 parts by weight of a photocuring agent in a solvent component containing 8 to 12 parts by weight of methyl cellosolve, 2 to 4 parts by weight of butyl alcohol, and 25 to 27 parts by weight of 1-methoxy-2-propanol, forming a hard coating member having an elastic modulus of 0.546 times to 2.4 times the elastic modulus of the base member and having a thickness of 0.001 times to 0.198 times the thickness of the base member by applying the hard coating solution to an upper portion of the base member, heat-drying the hard coating solution to remove the solvent, and photocuring the hard coating solution, and forming a damping member having an elastic modulus of 0.0000018 times to 0.02 times the elastic modulus of the base member and a thickness of 0.01 times to 2.97 times the thickness of the base member by applying a silicon-based adhesive layer or an acryl-based adhesive layer to a lower portion of the base member and curing the silicon-based adhesive layer or the acryl-based adhesive layer.

Advantageous Effects

A stacked structure for a display cover window having improved scratch resistance using a difference in elastic modulus and a method of manufacturing the same according to the present disclosure, have the following effects.

First, in the stacked structure for a display cover window having improved scratch resistance using a difference in elastic modulus and the method of manufacturing the same according to the present disclosure, it is possible to provide a stacked structure for a display cover window capable of being used in various environments or devices and having improved scratch resistance using a difference in elastic modulus by designing the stacked structure for a display cover window having improved scratch resistance using the difference in elastic modulus to make a stacked structure for a display cover window having improved scratch resistance it possible to be formed with a combination of various materials.

Second, in the stacked structure for a display cover window having improved scratch resistance using a difference in elastic modulus and the method of manufacturing the same according to the present disclosure, it is possible to provide a stacked structure for a display cover window having improved scratch resistance using the difference in elastic modulus, in which a normal force, which is a main component of the frictional force that is a main cause of scratching, is reduced, and at the same time, a damping layer absorbs and dissipates some of external stress, so that the scratch resistance is significantly improving by designing the stacked structure for a display cover window having improved scratch resistance using the difference in elastic modulus.

DESCRIPTION OF DRAWINGS

FIG. 1 is a flowchart of a method of manufacturing a stacked structure for a display cover window having improved scratch resistance using a difference in elastic modulus according to the present disclosure.

FIG. 2 is a diagram illustrating a basic cross-sectional configuration of a stacked structure for a display cover window having improved scratch resistance using a difference in elastic modulus of Examples 1, 2, 3 and 4, and a stacked structure for a display cover window of Comparative Examples 1 and 2.

FIG. 3 is a diagram for comparing a value of a normal force acting on a horizontal plane in a base member on which a hard coating member is formed without a damping member with a value of a normal force acting on an inclined surface in a base member on which a hard coating member is formed and beneath which a damping member is formed.

FIG. 4 is a diagram for comparing steel wool test results for determining the scratch resistance for Examples 1, 2, 3, and 4 and Comparative Examples 1 and 2.

BEST MODE

Terms and words used in the present specification and claims are not to be construed as a general or dictionary meaning but are to be construed as meaning and concepts meeting the technical ideas of the present disclosure based on a principle that the inventors can appropriately define the concepts of terms in order to describe their own inventions in best mode. Therefore, embodiments described in the specification of the present disclosure and configurations shown in the accompanying drawings do not represent all of the technical spirits of the present disclosure, but are merely most preferable embodiments of the present disclosure. Therefore, it is to be understood that various equivalents and modifications that can be substituted for them are possible or exist at the time of filing of the present disclosure.

Hereinafter, prior to describing the present disclosure with reference to the accompanying drawings, it is to be noted that unnecessary matters to reveal the gist of the present disclosure, that is, a known configuration that can be obviously added by a person skilled in the art, is not illustrated or specifically described.

Hereinafter, preferred examples, comparative examples, and experimental examples of the present disclosure will be described with reference to the accompanying drawings.

The stacked structure for a display cover window having improved scratch resistance according to the present disclosure includes a base member having an elastic modulus of 2.5 GPa to 5.5 GPa, a hard coating member disposed on the base member and having an elastic modulus of 0.546 times to 2.4 times the elastic modulus of the base member, and a damping member disposed beneath the base member and having an elastic modulus of 0.0000018 times to 0.02 times the elastic modulus of the base member.

In general, as a method for improving the surface hardness of a plastic material for a display cover window, research has been actively conducted using a sol-gel process to develop an organic/inorganic hybrid hard coating solution, or using a surface treatment technology such as vacuum deposition. However, in the case of simply applying hard coating, the surface hardness is generally improved, but an improvement effect of the scratch resistance is not generated in proportion to the improvement of the surface hardness. In addition, the addition of an inorganic filler such as nano-silica also improves properties such as surface hardness and heat-resistance, but an improvement effect of scratch resistance is not generated in proportion to the improvement of the surface hardness and the heat-resistance.

There is a limit to obtaining the desired scratch resistance only with such a simple improvement of chemical properties of materials. Therefore, in the present disclosure, apart from improving the chemical properties of the material, a plan for improving scratch resistance properties was completed by designing an interlayer physical structure constituting a stacked structure for a display cover window. Basically, in the present disclosure, the stacked structure for a display cover window had improved scratch resistance by disposing a hard coating member having an elastic modulus of 0.546 times to 2.4 times the elastic modulus of the base member on the base member having an elastic modulus of 2.5 GPa to 5.5 GPa, and a damping member having an elastic modulus of 0.0000018 times to 0.02 times the elastic modulus of the base member beneath the base member having an elastic modulus of 2.5 GPa to 5.5 GPa.

In the present disclosure, the hard coating member and the base member have elastic properties to resist excessive deformation of the hard coating layer due to external stress and prevent a fracture of the hard coating layer, thereby primarily improving scratch resistance, and the base member and the damping member have adhesive properties to absorb and dissipate some of the external stress when deformation of the stacked structure occurs, and reduce a normal force, which is a main component of the frictional force, thereby secondarily improving scratch resistance. In the present disclosure, the hard coating member and the base member resist excessive deformation of the stacked structure due to external stress and prevent a fracture of the hard coating layer, thereby primarily improving scratch resistance. Further, in the present disclosure, the base member and the damping member have a damping (absorbing) effect against external stress to absorb and dissipate some of the external stress and reduce a normal force, which is a main component of the frictional force, thereby secondarily improving scratch resistance.

As described above, in the stacked structure for a display cover window having improved scratch resistance according to the present disclosure having a multilayer structure with both elastic and adhesive properties, when external stress is applied to the stacked structure for a display cover window, primarily, an elastic layer (hard coating member and base member) resists deformation excessive enough for a fracture of the hard coating layer to occur due to the external stress, and secondarily, if the deformation of the stacked structure occurs within the range where the fracture of the hard coating layer does not occur, due to a damping effect of a adhesive layer (base member and damping member), a part of the stress is absorbed by the damping member and distributed as energy loss, such that the stress applied to the hard coating layer is reduced. Also, a normal force, which is a major component of the frictional force, is reduced by the slope generated when the deformation of the stacked structure occurs at a point where external stress is applied, thereby reducing the frictional force. In general, since the occurrence of scratches increases as the frictional force increases, it is important to design a physical stacked structure of a stacked structure for a display cover window that reduces frictional force under the same external stress as in the present disclosure.

In the stacked structure for a display cover window having improved scratch resistance according to the present disclosure, it is preferable that the base member has an elastic modulus of 2.5 GPa to 5.5 GPa. If the elastic modulus of the base member exceeds 5.5 GPa, the base member is vulnerable to impact, thereby increasing the possibility of breakage or rupture due to external stress. In addition, if the elastic modulus of the base member is less than 2.5 GPa, a degree of the basis member resisting excessive deformation of the stacked structure due to external stress is reduced, and the deformation of the hard coating layer becomes severe, such that a scratch is easily generated even with small external stress, and thus, improvement in scratch resistance may be insufficient.

In the stacked structure for a display cover window having improved scratch resistance according to the present disclosure, it is preferable that the hard coating member is disposed on the base member and has an elastic modulus of 0.546 times to 2.4 times the elastic modulus of the base member, and the damping member is disposed beneath the base member and has an elastic modulus of 0.0000018 times to 0.02 times the elastic modulus of the base member. In the present disclosure, if the elastic modulus of the hard coating member disposed on the base member is less than 0.546 times the elastic modulus of the base member, the degree of resistance to deformation due to external stress is weak, such that the hard coating layer may be destroyed, and thus, improvement in scratch resistance may be insufficient. In addition, in the present disclosure, if the elastic modulus of the hard coating member disposed on the base member exceeds 2.4 times the elastic modulus of the base member, a degree of the hard coating member resisting deformation due to external stress is excessively large, such that the hard coating member may rather be vulnerable to impact and breakage may occur in the hard coating member. In the present disclosure, if the elastic modulus of the damping member disposed beneath the base member is less than 0.0000018 times the elastic modulus of the base member, an insufficient adhesive strength between the display and the stacked structure for a display cover window allows the stacked structure for a display cover window to be easily detached from the display over time. In addition, in the present disclosure, if the elastic modulus of the damping member disposed beneath the base member exceeds 0.02 times the elastic modulus of the base member, the adhesive properties for absorbing external stress are weakened, and due to the decrease in the adhesive properties, the decrease in a normal force caused by a slope deformation of the stacked structure due to external stress is insufficient, and thus, improvement in scratch resistance may be insufficient.

In the present disclosure, it is preferable that the hard coating member has a thickness of 0.001 times to 0.198 times the thickness of the base member, and the damping member has a thickness of 0.01 times to 2.97 times the thickness of the base member. In the present disclosure, if the thickness of the hard coating member is less than 0.001 times the thickness of the base member, the degree of resistance to excessive deformation that may cause destruction of the hard coating layer due to external stress is weakened, and thus, improvement in scratch resistance may be insufficient. In the present disclosure, if the thickness of the hard coating member exceeds 0.198 times the thickness of the base member, impact resistance of the hard coating member is weakened, such that there is a risk of rupture or breakage of the hard coating member. In the present disclosure, if the thickness of the damping member is less than 0.01 times the thickness of the base member, the ability to absorb and dissipate external stress is reduced, and a slope deformation generated at the point where external stress is applied is also reduced, such that the effect of reducing a normal force, which is a major component of frictional force is reduced, and thus, improvement in scratch resistance may be insufficient. In the present disclosure, if the thickness of the damping member exceeds 2.97 times the thickness of the base member, the thickness of the stacked structure itself for a display cover window may be excessively thick, and recovery from external pressing or stamping may be difficult.

In the present disclosure, it is preferable that the base member has an elastic modulus of 2.5 GPa to 5.5 GPa, the hard coating member has an elastic modulus of 3.0 GPa to 6.0 GPa, and the damping member has an elastic modulus of 0.00001 GPa to 0.05 GPa. In the present disclosure, a hard coating member having an elastic modulus of 3.0 GPa to 6.0 GPa is disposed on the base member having an elastic modulus of 2.5 GPa to 5.5 GPa to resist excessive deformation of the stacked structure due to external stress, thereby primarily improving scratch resistance. In the present disclosure, a damping member having an elastic modulus of 0.00001 GPa to 0.05 GPa is disposed beneath the base member having an elastic modulus of 2.5 GPa to 5.5 GPa to absorb and dissipate some of the external stress, and at the same time, reduce a normal force, which is a major component of the frictional force, thereby secondarily improving scratch resistance. In principle, the hard coating member and the base member of the stacked structure for a display cover window having improved scratch resistance according to the present disclosure provide elastic properties to resist external stress so that the hard coating layer is not easily damaged by excessive deformation of the stacked structure due to external stress, thereby primarily improving scratch resistance, and at the same, the base member and the damping member provide adhesive properties to absorb and dissipate some of the external stress, and generate a slope deformation of the stacked structure at a point where external stress is applied to reduce normal force, which is a main component of the frictional force, thereby secondarily improving scratch resistance.

In the stacked structure for a display cover window having improved scratch resistance according to the present disclosure, if the elastic modulus of the hard coating member exceeds 6.0 GPa, hardness of the hard coating member becomes excessively large, such that there is a risk that the hard coating member will be vulnerable to impact and breakage will occur in the hard coating member. In addition, if the elastic modulus of the hard coating member is less than 3.0 GPa, a degree of the hard coating member preventing the fracture of the hard coat layer by resisting excessive deformation of the stacked structure due to external stress is weak, and thus, improvement in scratch resistance may be insufficient.

In the stacked structure for a display cover window having improved scratch resistance according to the present disclosure, if the elastic modulus of the base member exceeds 5.5 GPa, it is weakened against impact, thereby increasing the possibility of breakage or rupture due to external stress. In addition, if the elastic modulus of the base member is less than 2.5 GPa, the degree of resistance to excessive deformation of the stacked structure due to external stress is reduced, and the deformation of the hard coating layer becomes severe, such that scratches are easily generated even with small external stresses, and thus, improvement in scratch resistance may be insufficient.

In the stacked structure for a display cover window having improved scratch resistance according to the present disclosure, if the elastic modulus of the damping member exceeds 0.05 GPa, the adhesive properties for absorbing external stress are weakened, and due to the decrease in the adhesive properties, the decrease in a normal force caused by a slope deformation of the stacked structure occurring at the point where the external stress is applied is insufficient, and thus, improvement in scratch resistance may be insufficient. In addition, if the elastic modulus of the damping member is less than 0.00001 GPa, an insufficient adhesive strength between the display and the stacked structure for a display cover window allows the stacked structure for a display cover window to be easily detached from the display over time.

In the stacked structure for a display cover window having improved scratch resistance according to the present disclosure, it is preferable that the base member has a thickness of 101 µm to 1000 µm, the hard coating member has a thickness of 1 µm to 20 µm, and the damping member has a thickness of 10 µm to 300 µm.

In the stacked structure for a display cover window having improved scratch resistance according to the present disclosure, if the thickness of the base member is less than 101 µm, the degree of resistance to excessive deformation of the stacked structure due to external stress is reduced, and the deformation of the hard coating layer becomes severe, such that scratches are easily generated even with small external stresses, and thus, improvement in scratch resistance may be insufficient. In addition, if the thickness of the base member exceeds 1000 µm, the thickness of the stacked structure for a display cover window itself becomes excessively thick, and it is weakened against impact, thereby increasing the possibility of breakage or rupture due to external stress.

In the stacked structure for a display cover window having improved scratch resistance according to the present disclosure, if the thickness of the hard coating member is less than 1 µm, the surface hardness is lowered, and the degree of resistance to excessive deformation of the stacked structure due to external stress is weakened, and thus, improvement in scratch resistance may be insufficient. In addition, if the thickness of the hard coating member exceeds 20 µm, impact resistance of the hard coating member becomes weak, such that there is a risk that the hard coating member will be vulnerable to the impact and rupture or breakage will occur in the hard coating member.

In the stacked structure for a display cover window having improved scratch resistance according to the present disclosure, if the thickness of the damping member is less than 10 µm, adhesive properties of the damping member absorbing and dissipating external stress may be decreased, and a reduction in normal force caused by a slope deformation of the stacked structure occurring at a point to which external stress is applied due to the decrease in adhesive properties is insufficient, and thus, improvement in scratch resistance may be insufficient. In addition, if the thickness of the damping member exceeds 300 µm, the thickness of the stacked structure itself for a display cover window may become excessively thick, and recovery of the stacked structure for a display cover window from external pressing or stamping may be difficult.

In the stacked structure for a display cover window having improved scratch resistance according to the present disclosure, the base member may include a first base member having a thickness of 45 µm to 350 µm, an auxiliary damping member disposed beneath the first base member and having a thickness of 11 µm to 300 µm, and a second base member disposed beneath the auxiliary damping member and having a thickness of 45 µm to 350 µm. As described above, when the base member is divided into the first base member and the second base member in this way, and the auxiliary damping member is positioned therebetween, the adhesive properties of absorbing and dissipating external stress are strengthened, and the reduction in a normal force caused by a slope deformation of the stacked structure occurring at the point where external stress is applied is increased, thereby further amplifying the improvement of scratch resistance. In the stacked structure for a display cover window having improved scratch resistance according to the present disclosure, if the thickness of at least one of the first base member or the second base member is less than 45 µm, the degree of resistance to deformation due to external stress may be insufficient, and scratching may easily occur even with small external stress. If the thickness of at least one of the first base member or the second base member exceeds 350 µm, the thickness of the stacked structure for a display cover window itself becomes excessively thick, making it weak against impact, and the possibility of breakage or rupture due to external stress increases. In the stacked structure for a display cover window having improved scratch resistance according to the present disclosure, if the thickness of the auxiliary damping member is less than 11 μm, the adhesive properties of absorbing external stress may be weakened, the ability to reduce a normal force caused by a slope deformation of the stacked structure occurring at the point where external stress is applied may be insufficient, and scratch resistance problems may arise. In addition, if the thickness of the auxiliary damping member exceeds 300 μm, the thickness of the stacked structure for a display cover window itself may be excessively thick, and recovery from external pressing or stamping may be difficult.

In the stacked structure for a display cover window having improved scratch resistance according to the present disclosure, the hard coating member may include 3 to 5 parts by weight of hexamethylene diisocyanate trimer (HDI-trimer), 20 to 24 parts by weight of pentaerythritol triacrylate (PETA), 10 to 15 parts by weight of nano-silica, 5 to 8 parts by weight of methyl methacrylate, 10 to 15 parts by weight of a curing agent, 0.1 to 0.5 parts by weight of a leveling agent, and 1 to 2 parts by weight of a photocuring agent, the base member, the first base member, and the second base member may include poly(methyl methacrylate) (PMMA), and the damping member and the auxiliary damping member may include any one of a cured silicon-based adhesive layer or a cured acryl-based adhesive layer.

In the stacked structure for a display cover window having improved scratch resistance according to the present disclosure, if the hard coating member is out of the range of 3 to 5 parts by weight of hexamethylene diisocyanate trimer (HDI-trimer), 20 to 24 parts by weight of pentaerythritol triacrylate (PETA), 10 to 15 parts by weight of nano-silica, 5 to 8 parts by weight of methyl methacrylate, 10 to 15 parts by weight of a curing agent, 0.1 to 0.5 parts by weight of a leveling agent, and 1 to 2 parts by weight of a photocuring agent, the elastic modulus range of the hard coating member may be out of the range of 0.546 times to 2.4 times the elastic modulus of the base member, or the elastic modulus range of the hard coating member may be out of 3.0 GPa to 6.0 GPa, and thus, improvement in scratch resistance may be insufficient. In some cases, in the stacked structure for a display cover window having improved scratch resistance according to the present disclosure, the range of the elastic modulus of the hard coating member may be adjusted through a change in heat-drying conditions for removing the solvent and photocuring conditions.

In the stacked structure for a display cover window having improved scratch resistance according to the present disclosure, it is desirable for the base member, the first base member, and the second base member to have a material of poly(methyl methacrylate) (PMMA), and the elastic modulus of the base member, the first base member, and the second base member may be adjusted in the range of 2.5 GPa to 5.5 GPa by adjusting the molecular weight of poly(methyl methacrylate) (PMMA).

In the stacked structure for a display cover window having improved scratch resistance according to the present disclosure, it is desirable for the damping member and the auxiliary damping member to have either material of a cured silicon-based adhesive layer or a cured acryl-based adhesive layer, and the elastic modulus of the damping member and the auxiliary damping member may be adjusted to have an elastic modulus of 0.0000018 times to 0.02 times the elastic modulus of the base member or a range of 0.00001 GPa to 0.05 GPa by adjusting the degree of curing of silicon and acryl. If the elastic modulus range of the damping member and the auxiliary damping member is out of the range of 0.0000018 times to 0.02 times the elastic modulus of the base member or the elastic modulus range of the damping member is out of 0.00001 GPa to 0.05 GPa, improvement in scratch resistance may be insufficient.

FIG. 1 is a flow chart of a method of manufacturing a stacked structure for a display cover window having improved scratch resistance using a difference in elastic modulus according to the present disclosure.

Referring to FIG. 1, the method of manufacturing a stacked structure for a display cover window having improved scratch resistance using a difference in elastic modulus according to the present disclosure includes the steps of: preparing a base member having an elastic modulus of 2.5 GPa to 5.5 GPa and a thickness of 101 μm to 1000 μm and made of poly(methyl methacrylate) (PMMA) materials, preparing a hard coating solution by dissolving a solid component containing 3 to 5 parts by weight of hexamethylene diisocyanate trimer (HDI-trimer), 20 to 24 parts by weight of pentaerythritol triacrylate (PETA), 10 to 15 parts by weight of nano-silica, 5 to 8 parts by weight of methyl methacrylate, 10 to 15 parts by weight of a curing agent, 0.1 to 0.5 parts by weight of a leveling agent and 1 to 2 parts by weight of a photocuring agent in a solvent component containing 8 to 12 parts by weight of methyl cellosolve, 2 to 4 parts by weight of butyl alcohol, and 25 to 27 parts by weight of 1-methoxy-2-propanol, forming a hard coating member having an elastic modulus of 0.546 times to 2.4 times the elastic modulus of the base member and having a thickness of 0.001 times to 0.198 times the thickness of the base member by applying the hard coating solution to an upper portion of the base member, heat-drying the hard coating solution to remove the solvent, and photocuring the hard coating solution, and forming a damping member having an elastic modulus of 0.0000018 times to 0.02 times the elastic modulus of the base member and a thickness of 0.01 times to 2.97 times the thickness of the base member by applying a silicon-based adhesive layer or an acryl-based adhesive layer to a lower portion of the base member and curing the silicon-based adhesive layer or the acryl-based adhesive layer.

The preparing of the base member is preparing a base member made of poly (methyl methacrylate) (PMMA) material wherein the elastic modulus is adjusted in the range of 2.5 GPa to 5.5 GPa and the thickness is adjusted in the range of 101 μm to 1000 μm through the adjustment of the molecular weight of poly(methyl methacrylate) (PMMA) materials, and through such a adjustment process, the base member has an elastic modulus of 2.5 GPa to 5.5 GPa and a thickness of 101 μm to 1000 μm.

In the preparing of the hard coating solution by dissolving a solid component containing 3 to 5 parts by weight of hexamethylene diisocyanate trimer (HDI-trimer), to 24 parts by weight of pentaerythritol triacrylate (PETA), 10 to 15 parts by weight of nano-silica, 5 to 8 parts by weight of methyl methacrylate, 10 to 15 parts by weight of a curing agent, 0.1 to 0.5 parts by weight of a leveling agent and 1 to 2 parts by weight of a photocuring agent in a solvent component containing 8 to 12 parts by weight of methyl cellosolve, 2 to 4 parts by weight of butyl alcohol, and 25 to 27 parts by weight of 1-methoxy-2-propanol, if the components of the hard coating solution are out of the specified range, the elastic modulus range of the hard coating member to be produced later may be out of the range of 3.0 GPa to 6.0 GPa, and thus, improvement in scratch resistance may be insufficient.

The forming of the hard coating member is forming a hard coating member having an elastic modulus of 0.546 times to 2.4 times the elastic modulus of the base member and having a thickness of 0.001 times to 0.198 times the thickness of the base member by applying the hard coating solution to an upper portion of the base member, heat-drying the hard coating solution to remove the solvent, and photocuring the hard coating solution.

In this case, the forming of the hard coating member may be forming a hard coating member having an elastic modulus in the range of 3.0 GPa to 6.0 GPa by applying the hard coating solution to the upper portion of the base member, heat-drying the hard coating solution at 80° C. to 90° C. for 30 seconds to 90 seconds to remove the solvent of methyl cellosolve, butyl alcohol, and 1-methoxy-2-propanol, and irradiating and photocuring the hard coating solution with ultraviolet at an amount of light of 300 mJ to 4 mJ.

If the process conditions of the preparing of the hard coating solution and the forming of the hard coating member are not satisfied, the range of the elastic modulus of the formed hard coating member is out of the range of 0.546 times to 2.4 times the elastic modulus of the base member, and the thickness of the hard coating member is out of the range of 0.001 times to 0.198 times the thickness of the base member, and thus, improvement in scratch resistance may be insufficient.

The forming of the damping member is forming a damping member having an elastic modulus of 0.0000018 times to 0.02 times the elastic modulus of the base member and a thickness of 0.01 times to 2.97 times the thickness of the base member by applying a silicon-based adhesive layer or an acryl-based adhesive layer to a lower portion of the base member and curing the silicon-based adhesive layer or the acryl-based adhesive layer.

In this case, the forming of the damping member may be forming a damping member having an elastic modulus range of 0.00001 GPa to 0.05 GPa by applying the silicon-based adhesive layer or the acryl-based adhesive layer to the lower portion of the base member, primarily heat-curing the silicon-based adhesive layer or the acryl-based adhesive layer at 110° C. to 130° C. for 90 to 150 seconds, and secondarily heat-curing the silicon-based adhesive layer or the acryl-based adhesive layer at 150° C. to 170° C. for 90 to 150 seconds.

If the process conditions of the forming of the damping member are not satisfied, the range of the elastic modulus of the formed damping member is out of the range of 0.0000018 times to 0.02 times the elastic modulus of the base member, and the thickness of the damping member is out of the range of 0.01 times to 2.97 times the thickness of the base member, and thus, improvement in scratch resistance may be insufficient.

Example 1

In order to manufacture a stacked structure for a display cover window having improved scratch resistance using a difference in elastic modulus according to the present disclosure, a base member having an elastic modulus of 3.3 GPa and a thickness of 200 μm and made of poly(methyl methacrylate) (PMMA) materials was prepared. A solid component containing 4 parts by weight of hexamethylene diisocyanate trimer (HDI-trimer), 22 parts by weight of pentaerythritol triacrylate (PETA), 13 parts by weight of nano-silica, 7 parts by weight of methyl methacrylate, 12.5 parts by weight of a curing agent, 0.3 parts by weight of leveling agent, and 1.5 parts by weight of a photocuring agent was dissolved in a solvent component containing 10 parts by weight of methyl cellosolve, 3 parts by weight of butyl alcohol, and 26 parts by weight of 1-methoxy-2-propanol to prepare a hard coating solution. The prepared hard coating solution was applied to the upper portion of the base member using a bar coder No. 12, heat-drying was performed at 85° C. for 60 seconds to remove the solvent, and ultraviolet-photocuring was performed with a light amount of 350 mJ to form a hard coating member having an elastic modulus of 4.7 GPa and a thickness of 7.3 μm. Two silicon-based adhesives (SC3300L and SG6500A, KCC Corporation) were mixed in 50 parts by weight and 50 parts by weight, and a silicon-based adhesive formed by adding 1 part by weight of a curing agent (SK0010C, KCC Corporation), part by weight of a crosslinking agent (SC0016B, KCC Corporation), and 1 part by weight of a platinum catalyst mixture (SH0003A, KCC Corporation) thereto was applied using bar coater Nos. 24 to 36. Thereafter, primary heat-curing was performed at 120° C. for 12 seconds and secondary heat-curing was performed at 160° C. for 120 seconds to form a damping member having an elastic modulus of 0.03 GPa and a thickness of 10 μm.

Example 2

In order to manufacture a stacked structure for a display cover window having improved scratch resistance using the difference in elastic modulus according to the present disclosure, a base member having an elastic modulus of 3.5 GPa and a thickness of 150 μm and made of poly(methyl methacrylate) (PMMA) materials was prepared. A solid component containing 4 parts by weight of hexamethylene diisocyanate trimer (HDI-trimer), 22 parts by weight of pentaerythritol triacrylate (PETA), 13 parts by weight of nano-silica, 7 parts by weight of methyl methacrylate, 12.5 parts by weight of a curing agent, 0.3 parts by weight of leveling agent, and 1.5 parts by weight of a photocuring agent was dissolved in a solvent component containing 10 parts by weight of methyl cellosolve, 3 parts by weight of butyl alcohol, and 26 parts by weight of 1-methoxy-2-propanol to prepare a hard coating solution. The prepared hard coating solution was applied to the upper portion of the base member using a bar coder No. 12, heat-drying was performed at 85° C. for 60 seconds to remove the solvent, and ultraviolet-photocuring was performed with a light amount of 350 mJ to form a hard coating member having an elastic modulus of 4.4 GPa and a thickness of 8.3 μm. Two silicon-based adhesives (SC3300L and SG6500A, KCC Corporation) were mixed in 50 parts by weight and 50 parts by weight, and a silicon-based adhesive formed by adding 1 part by weight of a curing agent (SK0010C, KCC Corporation), part by weight of a crosslinking agent (SC0016B, KCC Corporation), and 1 part by weight of a platinum catalyst mixture (SH0003A, KCC Corporation) thereto was applied using bar coater Nos. 24 to 36. Thereafter, primary heat-curing was performed at 120° C. for 12 seconds and secondary heat-curing was performed at 160° C. for 120 seconds to form a damping member having an elastic modulus of 0.02 GPa and a thickness of 20 μm.

Example 3

In order to manufacture a stacked structure for a display cover window having improved scratch resistance using the difference in elastic modulus according to the present disclosure, a base member having an elastic modulus of 3.7 GPa and a thickness of 125 μm and made of poly(methyl methacrylate) (PMMA) materials was prepared. A solid component containing 4 parts by weight of hexamethylene diisocyanate trimer (HDI-trimer), 22 parts by weight of pentaerythritol triacrylate (PETA), 13 parts by weight of nano-silica, 7 parts by weight of methyl methacrylate, 12.5 parts by weight of a curing agent, 0.3 parts by weight of leveling agent, and 1.5 parts by weight of a photocuring agent was dissolved in a solvent component containing 10 parts by weight of methyl cellosolve, 3 parts by weight of butyl alcohol, and 26 parts by weight of 1-methoxy-2-propanol to prepare a hard coating solution. The prepared hard coating solution was applied to the upper portion of the base member using a bar coder No. 12, heat-drying was performed at 85° C. for 60 seconds to remove the solvent, and ultraviolet-photocuring was performed with a light amount of 350 mJ to form a hard coating member having an elastic modulus of 4.9 GPa and a thickness of 6.0 μm. Two silicon-based adhesives (SC3300L and SG6500A, KCC Corporation) were mixed in 50 parts by weight and 50 parts by weight, and a silicon-based adhesive formed by adding 1 part by weight of a curing agent (SK0010C, KCC Corporation), part by weight of a crosslinking agent (SC0016B, KCC Corporation), and 1 part by weight of a platinum catalyst mixture (SH0003A, KCC Corporation) thereto, was applied using a 4-side applicator. Thereafter, primary heat-curing was performed at 120° C. for 12 seconds and secondary heat-curing was performed at 160° C. for 120 seconds to form a damping member having an elastic modulus of 0.05 GPa and a thickness of 30 μm.

Example 4

In order to manufacture a stacked structure for a display cover window having improved scratch resistance using the difference in elastic modulus according to the present disclosure, a base member having an elastic modulus of 4.0 GPa and a thickness of 110 μm and made of poly(methyl methacrylate) (PMMA) materials was prepared. A solid component containing 4 parts by weight of hexamethylene diisocyanate trimer (HDI-trimer), 22 parts by weight of pentaerythritol triacrylate (PETA), 13 parts by weight of nano-silica, 7 parts by weight of methyl methacrylate, 12.5 parts by weight of a curing agent, 0.3 parts by weight of leveling agent, and 1.5 parts by weight of a photocuring agent was dissolved in a solvent component containing 10 parts by weight of methyl cellosolve, 3 parts by weight of butyl alcohol, and 26 parts by weight of 1-methoxy-2-propanol to prepare a hard coating solution. The prepared hard coating solution was applied to the upper portion of the base member using a bar coder No. 12, heat-drying was performed at 85° C. for 60 seconds to remove the solvent, and ultraviolet-photocuring was performed with a light amount of 350 mJ to form a hard coating member having an elastic modulus of 4.6 GPa and a thickness of 7.6 μm. Two silicon-based adhesives (SC3300L and SG6500A, KCC Corporation) were mixed in 50 parts by weight and 50 parts by weight, and a silicon-based adhesive formed by adding 1 part by weight of a curing agent (SK0010C, KCC Corporation), part by weight of a crosslinking agent (SC0016B, KCC Corporation), and 1 part by weight of a platinum catalyst mixture (SH0003A, KCC Corporation) thereto was applied using a 4-side applicator. Thereafter, primary heat-curing was performed at 120° C. for 12 seconds and secondary heat-curing was performed at 160° C. for 120 seconds to form a damping member having an elastic modulus of 0.01 GPa and a thickness of 40 μm.

Comparative Example 1

In order to manufacture a stacked structure for a display cover window compared to that of the present disclosure, four base members having an elastic modulus of 2.4 GPa and a thickness of 125 μm and made of polyethylene terephthalate (PET) material were manufactured. A solid component containing 4 parts by weight of hexamethylene diisocyanate trimer (HDI-trimer), 22 parts by weight of pentaerythritol triacrylate (PETA), 13 parts by weight of nano-silica, 7 parts by weight of methyl methacrylate, 12.5 parts by weight of a curing agent, 0.3 parts by weight of leveling agent, and 1.5 parts by weight of a photocuring agent was dissolved in a solvent component containing 10 parts by weight of methyl cellosolve, 3 parts by weight of butyl alcohol, and 26 parts by weight of 1-methoxy-2-propanol to prepare a hard coating solution. The prepared hard coating solution was applied to the upper portion of the base member using a bar coder No. 12, heat-drying was performed at 85° C. for 60 seconds to remove the solvent, and ultraviolet-photocuring was performed with a light amount of 350 mJ to form a hard coating member having an elastic modulus of 4.4 GPa to 4.6 GPa and a thickness of 6.7 μm to 7.5 μm. Two silicon-based adhesives (SC3300L and SG6500A, KCC Corporation) were mixed in 50 parts by weight and 50 parts by weight, and a silicon-based adhesive formed by adding 1 part by weight of a curing agent (SK0010C, KCC Corporation), 1 part by weight of a crosslinking agent (SC0016B, KCC Corporation), and 1 part by weight of a platinum catalyst mixture (SH0003A, KCC Corporation) thereto was applied using bar coater Nos. 24 to 36 or a 4-side applicator. Thereafter, primary heat curing was performed at 120° C. for 12 seconds and secondary heat curing was performed at 160° C. for 120 seconds to form damping members having an elastic modulus of 0.02 to 0.04 GPa and having thicknesses of 10 μm, 20 μm, 30 μm, and 40 μm, respectively.

Comparative Example 2

In order to manufacture a stacked structure for a display cover window compared to that of the present disclosure, four base members having an elastic modulus of 0.05 GPa and a thickness of 100 μm and made of thermoplastic polyurethane (TPU) materials were prepared. A solid component containing 4 parts by weight of hexamethylene diisocyanate trimer (HDI-trimer), 22 parts by weight of pentaerythritol triacrylate (PETA), 13 parts by weight of nano-silica, 7 parts by weight of methyl methacrylate, 12.5 parts by weight of a curing agent, 0.3 parts by weight of leveling agent, and 1.5 parts by weight of a photocuring agent was dissolved in a solvent component containing 10 parts by weight of methyl cellosolve, 3 parts by weight of butyl alcohol, and 26 parts by weight of 1-methoxy-2-propanol to prepare a hard coating solution. The prepared hard coating solution was applied to the upper portion of the base member using a bar coder No. 12, heat-drying was performed at 85° C. for 60 seconds to remove the solvent, and ultraviolet-photocuring was performed with a light amount of 350 mJ to form a hard coating member having an elastic modulus of 4.6 to 4.8 GPa and a thickness of 6.8 to 7.1 μm. Two silicon-based adhesives (SC3300L and SG6500A, KCC Corporation) were mixed in 50 parts by weight and 50 parts by weight, and a silicon-based adhesive formed by adding 1 part by weight of a curing agent (SK0010C, KCC Corporation), 1 part by weight of a cross-linking agent (SC0016B, KCC Corporation), and 1 part by weight of a platinum catalyst mixture (SH0003A, KCC Corporation) thereto was applied using bar coater Nos. 24 to 36 or a 4-side applicator, Thereafter, primary heat curing was performed at 120° C. for 12 seconds and secondary heat curing was performed at 160° C. for 120 seconds to form a damping member having an elastic modulus of 0.02 to 0.03 GPa and having thicknesses of 10 µm, 20 µm, 30 µm, and 40 µm, respectively.

FIG. 2 is a diagram illustrating a basic cross-sectional configuration of a stacked structure for a display cover window having improved scratch resistance using a difference in elastic modulus of Examples 1, 2, 3 and 4, and a stacked structure for a display cover window of Comparative Examples 1 and 2.

According to FIG. 2, the stacked structure for a display cover window has a sandwich structure in which the base member is interposed between the hard coating member and the damping member.

In order to evaluate the roughness of the surface of the hard coating member in the stacked structures for a display cover window of Examples 1, 2, 3 and 4, AFM (Tosca™, Anton Paar GmbH.) was used to measure RMS (Root Mean Square) roughness values. Measurement conditions were measured at intervals of 0.125 µm for each axis at the size of a horizontal axis 50 µm and a vertical axis 50 µm of the sample. Table 1 shows the thickness of the hard coating member and the degree of roughness of the surface of the hard coating member measured in the stacked structures for a display cover window of Examples 1, 2, 3, and 4.

TABLE 1

| Sample name | Hard coating member thickness (µm) | RMS Roughness (nm) |
|---|---|---|
| Example 1 | 7.3 | 1.70 |
| Example 2 | 8.3 | 1.66 |
| Example 3 | 6.0 | 1.70 |
| Example 4 | 7.6 | 1.73 |

It can be seen from Table 1 that the stacked structures for a display cover window of Examples 1, 2, 3, and 4 have an approximate hard coating member thickness and approximate RMS roughness, and thus have similar surface conditions. That is, the surface roughness values of the stacked structures for a display cover window of Examples 1, 2, 3, and 4 were all in the range of 1.66 nm to 1.73 nm, showing almost similar values. This is because the hard coating member was formed by applying a hard coating solution of the same component to a base member made of the same PMMA materials at an approximate thickness and using the same curing conditions. The RMS roughness values shown in the four examples were very low, which show that the surface of the hard coating member is very smooth. It can be seen that since each example has a similar surface condition, among the normal force and the friction coefficient, which are two components that influence the friction force in a scratch test to determine scratch resistance, the friction coefficient of the surface of the hard coating member has very similar values to respective examples. Therefore, a change in scratch properties depending on a change in a thickness of damping members may be evaluated by observing a change in a normal force depending on a thickness change of the damping member in the stacked structures for a display cover window of Examples 1, 2, 3, and 4.

FIG. 3 is a diagram for comparing a value of a normal force acting on a horizontal plane in a base member on which a hard coating member is formed without a damping member with a value of a normal force acting on an inclined surface in a base member on which a hard coating member is formed and beneath which a damping member is formed.

According to FIG. 3, the frictional force has the following components.

$$\text{Friction force (F)}=\text{Friction coefficient (µ)}\times\text{Normal force (N)}$$

Wherein the friction coefficient µ may vary depending on the material of the object, the degree of smoothness of the surface, the presence or absence of a lubricant, etc. However, if the materials and the surface conditions of the hard coating members are similar to each other, as in the samples of Examples 1, 2, 3, 4, and Comparative Examples 1 and 2 used in the present disclosure, the friction force is dominantly affected by the normal force rather than the friction coefficient. In this case, as shown in FIG. 3, the base member on which a hard coating member is formed without the damping member has a value of the normal force N=mg acting in a horizontal plane, and as shown in FIG. 3, the base member on which the hard coating member is formed and beneath which the damping member is formed has a value of the normal force N=mg Cos θ acting on an inclined surface. As a result, the normal force (N=mg) of the base member on which the hard coating member is formed without the damping member, is always greater than the normal force (N=mg Cos θ, θ>0°) of the base member on which the hard coating member is formed and beneath which the damping member is formed when the same external stress is applied. When a load for exerting external stress is applied to the base member having the damping member and on which the hard coating member is formed, a slope occurs under a steel wool bar moving by applying the load due to the pressing of the damping member. Also, the thicker the thickness the damping member, the greater the slope θ, and thus, the smaller the normal force. That is, the base member having the damping member and on which the hard coating member is formed has a normal force (N) acting on an inclined surface and a value of a normal force (N=mg Cos θ) that is reduced than the external stress value, as shown in FIG. 3. As a result, the greater the inclination angle value θ, the smaller the normal force valued N, and thus, the smaller the frictional force value F, thereby improving the scratch resistance.

Experimental Example 1

In order to measure a friction, a abrasion and an elastic recovery rate of each of the hard coating members of Examples 1, 2, 3, and 4 of the stacked structure for a display cover window having improved scratch resistance according to the present disclosure, a commercial indenter (Micro Scratch Tester (MST), Anton Parr GmbH.) was used to evaluate the scratch properties and are shown in Tables 2 and 3. The scratch properties were measured by increasing a load at a speed of 233 mN/sec until an end load became 7,000 mN, starting with a begin load of 10 mN on a progressive method indenter. A movement speed of a tip was 12 ram/min, and a scratch length was 6 mm. After each 6 mm of scratch was finished, the same tip was used in order to measure a residual scratch depth, and the scratch depth was re-scanned with a scanning load of 10 mN. As an indenter, a Rockwell type diamond tip (AI-200) having a radius of 200 μm and an angle of 120° was used in Experimental Example 1. This Experimental Example 1 enables the evaluation of elastic recovery of the stacked structure for a display cover window having improved scratch resistance with viscoelastic properties. In addition, the scratch properties depending on the increase in the thickness of the damping member of the stacked structure for a display cover window having improved scratch resistance with viscoelastic properties, that is, the adhesive layer, were evaluated.

Table 2 shows a maximum stress values at which scratches occur in Examples 1, 2, 3, and 4 in which silicon-based adhesive layers were introduced at thicknesses of 10 μm, 20 μm, 30 μm, and 40 μm, respectively.

TABLE 2

| | Silicon-based adhesive layer | | | |
| --- | --- | --- | --- | --- |
| | 10 μm | 20 μm | 30 μm | 40 μm |
| Stress (mN) | 1994.322 | 2492.374 | 5470.648 | 5578.492 |

It was found from Table 2 that in Example 1, the stacked structure for a display cover window having improved scratch resistance, in which a silicon-based adhesive layer was introduced at a thickness of 10 μm was scratched at 1994.322 mN, and in Example 4, the stacked structure for a display cover window having improved scratch resistance, in which a silicon-based adhesive layer was introduced at a thickness of 40 μm was scratched at 5578.492 mN. Within the range that the stacked structure for a display cover window may withstand deformation fracture due to stress, the thicker the silicon-based adhesive layer, the greater the ability to damping external stress, resulting in scratches on the surface of the hard coating member under greater stress. That is, it can be seen that the thicker the silicon-based adhesive layer, the greater the maximum stress value at which scratches occur. It could be seen from the above results that increasing the thickness of the damping member in the stacked structure for a display cover window has an effect on improving scratch resistance. Table 3 shows peak Indentation depth, residual Indentation depth, and elastic recovery rate (%)[1] values when the same load (1,994 mN load applied to the structure when scratching occurs in the stacked structure for a display cover window having a 10 μm-thick silicon-based adhesive layer) was applied to the stacked structures of Examples 1, 2, 3, and 4 in which the silicon-based adhesive layers were introduced at thicknesses of 10 μm, 20 μm, 30 μm, and 40 μm.

TABLE 3

| Thickness of Silicon-based adhesive layer | Peak Indentation Depth | Residual Indentation Depth | Elastic Recovery Rate (%) |
| --- | --- | --- | --- |
| 10 μm | 13,180 nm | 1,023 nm | 92.24 |
| 20 μm | 14,702 nm | 716 nm | 95.13 |
| 30 μm | 15,539 nm | 619 nm | 96.02 |
| 40 μm | 16,186 nm | 422 nm | 97.39 |

Elastic Recovery Rate (%)=[(Peak Indentation Depth–Residual Indentation Depth)/(Peak Indentation Depth)]×100      (1)

When the same load was applied to the surface of the stacked structure for a display cover window while increasing the thickness of the silicon-based adhesive layer from 10

μm to 40 μm in the stacked structure for a display cover window, the peak indentation depth was increased and the residual indentation depth was rather decreased. When the thickness of the silicon-based adhesive layer having high adhesive properties in the viscoelastic stacked structure for a display cover window is increased, a damping effect against external stress is increased, and the peak indentation depth is increased. That is, the thicker the silicon-based adhesive layer, the greater the adhesive properties, and thus, the more the substrate was pressed against the same load, thereby increasing the peak indentation depth. On the other hand, increasing the damping effect of the silicon-based adhesive layer, that is, adhesive layer, reduces the stress actually applied to the surface of the hard coating member of the stacked structure for a display cover window, and reduces the residual indentation depth. The stacked structure for a display cover window in which the silicon-based adhesive layer is introduced exhibited a high elastic recovery rate (%) in all of Examples 1, 2, 3, and 4. When the thickness of the silicon-based adhesive layer was 10 μm, the elastic recovery rate (%) was 92.24%, and when the thickness of the silicon-based adhesive layer increased to 40 μm, the elastic recovery rate (%) increased to 97.39%. The reason is that when the thickness of the silicon-based adhesive layer having high adhesive properties increases in the stacked structure for a display cover window in which the adhesive layer is introduced, the damping effect of the silicon-based adhesive layer against external stress increases. As a result, the stress actually applied to the surface of the hard coating member of the stacked structure for a display cover window in which the adhesive layer is introduced is reduced.

Experimental Example 2

In order to measure the hardness and modulus for Examples 1, 2, 3, and 4 of the stacked structure for a display cover window having improved scratch resistance according to the present disclosure, a commercial indenter (Ultra nanoindenter (UNHT), Anton Paar GmbH.) was used to evaluate the mechanical properties and is shown in Table 4. In the present experiment, in order to evaluate the overall properties of the stacked structure for a display cover window having improved scratch resistance according to the present disclosure, the load was applied and measured so that the indentation depth was as deep as possible within a range in which the stacked structure may withstand deformation fracture due to stress.

Table 4 shows mechanical properties measured by applying a linear load of 95.0 mN for 60 seconds with a Berkovich indenter to the stacked structures for a display cover window having improved scratch resistance of Examples 1, 2, 3, and 4 in which silicon-based adhesive layers were introduced at thicknesses of 10 μm, 20 μm, 30 μm, and 40 μm, respectively.

TABLE 4

| Physical properties | Silicon-based adhesive layer | | | |
| --- | --- | --- | --- | --- |
| 물성 | 10 μm | 20 μm | 30 μm | 40 μm |
| $H_{IT}$ (O&P) , [MPa] | 391.657 | 355.167 | 359.346 | 376.990 |
| tanδ (Sinus mean) | 0.031 | 0.037 | 0.063 | 0.083 |
| Storage Modulus (Sinus mean), [GPa] | 4.593 | 4.322 | 3.716 | 3.794 |
| Loss Modulus (Sinus mean), [GPa] | 0.144 | 0.161 | 0.234 | 0.316 |

Table 4 shows that in the stacked structure for a display cover window having improved scratch resistance of Examples 1, 2, 3, and 4 in which silicon-based adhesive layers were introduced at thicknesses of 10 µm, 20 µm, 30 µm, and 40 µm, respectively, an indentation hardness HIT was 391.657 MPa when the thickness of the silicon-based adhesive layer is 10 µm, and an indentation hardness HIT was 376.990 MPa when the thickness of the silicon-based adhesive layer is 40 µm. Table 4 shows that the surface hardness of Example 1, Example 2, Example 3, and Example 4 in which the silicon-based adhesive layers were introduced at thicknesses of 10 µm, 20 µm, 30 µm, and 40 µm, respectively, is not affected by the change in the thickness of the silicon-based adhesive layer, and shows similar surface hardness values within a certain range of each other. That is, in the scratch test of the stacked structure for a display cover window having improved scratch resistance of Examples 1, 2, 3, and 4, when the silicon-based adhesive layer was thickened, the peak indentation depth increased in proportion to a thickness increase, but the indentation hardness HIT maintained similar surface hardness regardless of a thickness change. Therefore, it was confirmed that the surface hardness and scratch resistance are independent physical properties that are not correlated with each other. A tan δ value, which refers to the damping ability of the stacked structure for a display cover window having improved scratch resistance against external stress, was 0.031 when the thickness of the silicon-based adhesive layer is 10 µm, 0.037 when the thickness of the silicon-based adhesive layer is 20 µm, 0.063 when the thickness of the silicon-based adhesive layer is 30 µm, and 0.083 when the thickness of the silicon-based adhesive layer is 40 µm. As the thickness of the silicon-based adhesive layer increased, the tan δ value increased proportionally. The storage modulus, which is a component that acts as an overall elastic repulsion in the stacked structure for a display cover window having improved scratch resistance, gradually decreased from 4.593 GPa to 3.716 GPa while the thickness of the silicon-based adhesive layer increased from 10 µm to 30 µm. Also, when the thickness of the silicon-based adhesive layer is 40 µm, the storage modulus slightly increased to 3.794. On the other hand, loss modulus, a component that reduces the friction force, which is the main cause of scratches, by absorbing and dispersing some of the stress applied from the outside as energy loss, increased significantly from 0.144 GPa to 0.316 GPa while the thickness of the silicon-based adhesive layer increased from 10 µm to 40 µm. Therefore, the tan δ value, which is a ratio of the loss modulus to the storage modulus, increased in proportion to the thickness of the silicon-based adhesive layer. It could be seen from these characteristics that when a silicon-based adhesive layer having high adhesive properties was introduced into the stacked structure for a display cover window, scratch resistance properties can be improved regardless of the surface hardness of the stacked structure for a display cover window.

Experimental Example 3

In order to measure the friction and abrasion properties on the surface of the hard coating member of the stacked structure for a display cover window having improved scratch resistance with viscoelastic properties, the scratch properties of a basic sample consisting only of a 7.7 µm-thick hard coating member having an elastic modulus of 4.6 GPa without a silicon-based adhesive layer and a base member having an elastic modulus of 3.5 GPa and made of 150 µm-thick poly(methyl methacrylate) (PMMA) materials, and the samples of Examples 1, 2, 3 and 4 in which silicon-based adhesive layers were introduced at thicknesses of 10 µm, 20 µm, 30 µm, and 40 µm, respectively, were compared and evaluated by using an abrasion rubbing tester (No. 580, Yuyuinst Co., Ltd.). The scratch properties were evaluated by applying a load of 1 kg to a bar to which steel wool (#0000) was attached, and measuring the number of times of reciprocations up to a point in time when the scratch occurs on the hard coating film. Here, the bar reciprocates a movement distance of 40 mm at a movement speed of 60 RPM (Steel Wool Test).

The present experiment evaluated a phase difference between stress and strain exhibited by each sample when a sin-type stress such as a steel wool test was applied to the stacked structure for a display cover window on which a silicon-based adhesive layer was applied. For evaluation, in the present experiment, a base member (basic sample) coated with a hard coating member without a silicon-based adhesive layer and made of a PMMA material, and a base member (Example 4) applied with a silicon-based adhesive layer at a thickness of 40 µm, coated with a hard coating member, and made of a PMMA material were used. Also, for each sample, the steel wool test was conducted under two conditions of 20 RPM and 80 RPM as a reciprocating speed of steel wool. The results are shown in Tables 5 and 6.

Table 5 shows the results of a steel wool test of a base member (basic sample) coated with a hard coating member and made of a PMMA material without a silicon-based adhesive layer

TABLE 5

| The number of times of steel wool reciprocations | 20 RPM (27.6 mm/sec) | 80 RPM (107.7 mm/sec) |
|---|---|---|
| 20 | Scratch | Scratch |
| 15 | Scratch | Scratch |
| 10 | Scratch | Scratch |
| 9 | Scratch | Scratch |
| 8 | Scratch | Scratch |
| 7 | Scratch | Scratch |
| 6 | No Scratch | No Scratch |

Table 6 shows the results of a steel wool test of a base member (Example 4) applied with a silicon-based adhesive layer at a thickness of 40 µm, coated with a hard coating member, and made of PMMA.

TABLE 6

| The number of times of reciprocations of steel wool | 20 RPM (27.6 mm/sec) | 80 RPM (107.7 mm/sec) |
|---|---|---|
| 120 | Scratch | Scratch |
| 80 | Scratch | Scratch |
| 70 | Scratch | No Scratch |
| 60 | Scratch | No Scratch |
| 50 | Scratch | No Scratch |
| 40 | No Scratch | No Scratch |

In general, since a kinetic friction force is independent of the movement speed of the moving object, the magnitude of the friction force need to be the same even if the movement speed is different. This is well shown in the results of a steel wool test of a base member coated with a hard coating member and made of PMMA materials without a silicon-based adhesive layer in Table 5. In the case of a base member coated with a hard coating member and made of a PMMA material without a silicon-based adhesive layer in Table 5, when the scratch test was conducted at two speeds of 20 RPM and 80 RPM, the scratches occurred when the number of times of reciprocation for the steel wool was 7 in both cases. It can be seen from the results that the same magnitude of the kinetic friction force occurred regardless of the movement speed of the steel wool when the adhesive properties were small, like a base member coated with a hard coating member and made of PMMA materials without a silicon-based adhesive layer. Table 6 shows the results of a steel wool test of a base member (Example 4) applied with a silicon-based adhesive layer at a thickness of 40 μm, coated with a hard coating member, and made of a PMMA material.

Table 6 shows that a base member applied with a silicon-based adhesive layer at a thickness of 40 μm, coated with a hard coating member, and made of PMMA material exhibited a phenomenon in which the magnitude of the frictional force decreased as the movement speed of the moving object increases, resulting in increased scratch resistance. It could be seen that when the scratch resistance test was conducted on a base member applied with a silicon-based adhesive layer at a thickness of 40 μm, coated with a hard coating member, and made of a PMMA material at two movement speeds of 20 RPM and 80 RPM, a base member applied with a silicon-based adhesive layer at a thickness of 40 μm, coated with a hard coating member, and made of a PMMA material, has a greater number of times of reciprocations of the steel wool up to a point in time when the scratch occurs at both movement speeds, and thus has excellent scratch resistance, compared to a base member coated with a hard coating member and made of PMMA material without a silicon-based adhesive layer. In addition, a base member applied with a silicon-based adhesive layer at a thickness of 40 μm, coated with a hard coating member, and made of a PMMA material, showed a phenomenon in which the magnitude of the frictional force decreased as the movement speed of the moving object increased, resulting in increased scratch resistance. In a base member applied with a silicon-based adhesive layer at a thickness of 40 μm, coated with a hard coating member, and made of a PMMA material, at the movement speed of 20 RPM, the scratches occurred when the number of times of reciprocation is 50 for the steel wool, and at the movement speed of 80 RPM, scratching occurred when the number of times of reciprocation is 80 for the steel wool. As such, in the case of a base member applied with a silicon-based adhesive layer at a thickness of 40 μm, coated with a hard coating member, and made of a PMMA material, the normal force, which is a main component of the frictional force, was reduced due to the damping effect of the silicon-based adhesive layer against the external stress. Thus, a base member coated with a hard coating member, made of PMMA materials and having a silicon-based adhesive layer, had significantly improved scratch resistance than a base member coated with a hard coating member and made of PMMA material without a silicon-based adhesive layer. In addition, the above results show that as the movement speed of the steel wool bar increases in a base member coated with a hard coating member, made of a PMMA material and having a silicon-based adhesive layer, the number of times of reciprocations of the steel wool where scratches occurred, increased proportionally. That is, it could be seen that the magnitude of the kinetic friction force of the base member coated with a hard coating member, made of PMMA materials and having a silicon-based adhesive layer with adhesive properties, was affected by the movement speed. This is because a phase difference between stress and strain caused by an internal damping of the sample occurs when a sin-type stress is applied to a viscoelastic polymer material such as the base member coated with a hard coating member, made of PMMA materials, and having a silicon-based adhesive layer with adhesive properties. In the present experiment, in the base member coated with a hard coating member, made of PMMA materials, and having a silicon-based adhesive layer, the substrate is momentarily pressed due to the damping effect of the adhesive material at this point when the load of a moving steel wool bar arrives at a certain point. Here, an inclined surface occurs under the steel wool bar, which reduces the normal force. At the movement speed of the steel wool bar as low as 20 RPM, the silicon-based adhesive layer, which is a adhesive material, has enough time to be pressed against the load, and when the adhesive material is sufficiently pressed in this way, the slope of the inclined surface of the plastic substrate pressed in the local area just below the steel wool bar becomes gentle. As described above, the smaller the slope angle θ, the relatively higher the normal force value N, and accordingly, the frictional force value F also increase. As a result, it is determined that the effect of improving scratch resistance is partially reduced. On the other hand, if the movement speed of the steel wool bar is relatively high as 80 RPM, an initial inclination value generated by pressing a base member coated with a hard coating member, made of PMMA materials and having a silicon-based adhesive layer by the steel wool bar is kept constant. Therefore, if the movement speed of the steel wool bar is 80 RPM, the inclination angle value θ is larger and the normal force value N acts relatively smaller than in the case of 20 RPM. Thus, in the base member made of PMMA materials, coated with a hard coating member, and having a silicon-based adhesive layer, it is determined that the higher the movement speed of the steel wool bar, the higher the effect of improving the scratch resistance. It is generally known to have nothing to do with the movement speed considering the kinetic friction force. However, it can be seen that in the base member coated with a hard coating member, made of PMMA materials, and having a silicon-based adhesive layer, the thicker the silicon-based adhesive layer, the greater the adhesive properties, and the greater the effect of improving scratch resistance depending on the movement speed. It can be seen from this that the speed at which the adhesive material damps the load and the movement speed of the steel wool bar are interrelated and affect the frictional force (normal force). In the case of the base member made of PMMA materials, coated with a hard coating member, and having a silicon-based adhesive layer, the thicker the silicon-based adhesive layer (that is, the greater the influence of the viscous components), the greater the ability of the adhesive layer to damp the normal force against a load moving within a specific time range. As a result, it could be seen that the frictional force was lowered and the scratch resistance was increased. In the base member coated with a hard coating member made of PMMA materials, and having a silicon-based adhesive layer, the higher the movement speed of external stress, the proportional increase in the scratch resistance properties corresponds to useful properties that may prevent scratches when the stacked structure for a display cover window is used in various real environments.

Experimental Example 4

In order to measure the scratch resistance on the surface of the hard coating member of the stacked structure for a display cover window having improved scratch resistance with viscoelastic properties, scratch resistance properties of a base member coated only with a hard coating member and made of PMMA materials, base members (Examples 1, 2, 3, and 4) having silicon-based adhesive layers introduced at thicknesses of 10 μm, 20 μm, 30 μm, and 40 μm, respectively, coated with a hard coating member, and made of PMMA materials, a base member coated only with a hard coating member and made of PET materials, base members (Comparative Example 1) having silicon-based adhesive layers introduced at thicknesses of 10 μm, 20 μm, 30 μm, and 40 μm, respectively, coated with a hard coating member, and made of PET materials, a base member coated only with a hard coating member and made of TPU materials, and base members (Comparative Example 2) having silicon-based adhesive layers introduced at thicknesses of 10 μm, 20 μm, 30 μm, and 40 μm, respectively, coated with a hard coating member, and made of TPU materials were compared with each other and evaluated using an abrasion rubbing tester (No. 580, Yuyuinst Co., Ltd.).

FIG. 4 is a diagram for comparing steel wool test results for determining scratch resistance for Examples 1, 2, 3, and 4 and Comparative Examples 1 and 2.

FIG. 4A illustrates a comparison result between a case in which only the hard coating member is coated on the base member made of PMMA materials and a case in which the base member made of PMMA materials is coated with a hard coating member and silicon-based adhesive layers are introduced at thicknesses of 10 μm, 20 μm, 30 μm, and 40 μm, respectively (Examples 1, 2, 3, and 4). When the base member made of PMMA materials was coated with only the hard coating member, the number of times of reciprocations of the steel wool up to a point in time when the scratch occurs was only 5 (silicon-based adhesive layer thickness of 0 μm). As the thickness of the silicon-based adhesive layer increased to 10 μm, 20 μm, 30 μm, and 40 μm, the number of times of reciprocations of the steel wool up to a point in time when the scratch occurs, increased to 59 to 79. This value is a sharp increase of more than 10 times than without the silicon-based adhesive layer. FIG. 4B illustrates a comparison result between a case in which only the hard coating member is coated on the base member made of PET materials and a case in which the base member made of PET materials is coated with a hard coating member and silicon-based adhesive layers are introduced at thicknesses of 10 μm, 20 μm, 30 μm, and 40 μm, respectively (Comparative Example 1). When the base member made of PET materials was coated with only the hard coating member, the number of times of reciprocations of the steel wool up to a point in time when the scratch occurs was only 8 (silicon-based adhesive layer thickness of 0 μm). Also, as the thickness of the silicon-based adhesive layer increased to 10 μm, 20 μm, 30 μm, and 40 μm, the number of times of reciprocations of the steel wool up to a point in time when the scratch occurs, increased to 15 to 27. This value is 2 to 3 times higher than without silicon-based adhesive layer. FIG. 4C illustrates a comparison result between a case in which only the hard coating member is coated on the base member made of TPU materials and a case in which the base member made of TPU materials is coated with a hard coating member and silicon-based adhesive layers are introduced at thicknesses of 10 μm, 20 μm, 30 μm, and 40 μm, respectively (Comparative Example 2). When the base member made of TPU materials was coated with only the hard coating member, the number of times of reciprocations of the steel wool up to a point in time when the scratch occur was only 7 (silicon-based adhesive layer thickness of 0 μm). Also, as the thickness of the silicon-based adhesive layer increased to 10 μm and 20 μm, the number of times of reciprocations of the steel wool up to a point in time when the scratch occur, decreased to 2 to 7 and recovered, and as the thickness of the silicon-based adhesive layer increased to 30 μm and 40 μm, the number of times of reciprocations of the steel wool up to a point in time when the scratch occur, increased to 12 to 14. This value is about 2 times higher than without silicon-based adhesive layer.

According to the above results, when the hard coating member and the damping member were introduced to the base member having an elastic modulus in the range of 2.5 GPa to 5.5 GPa and made of PMMA materials, the damping effect against external stress was large, and the normal force and friction force were reduced, resulting in improved scratch resistance. On the other hand, when PET with a lower elastic modulus than PMMA, which has an elastic modulus in the range of 2.5 GPa to 5.5 GPa, was used as a base member and a hard coating member and a damping member were introduced, a certain degree of improvement in scratch resistance occurred. However, the degree of improvement was insufficient compared to the case of using a base member made of PMMA having an elastic modulus in the range of 2.5 GPa to 5.5 GPa. Furthermore, when a hard coating member and a damping member were introduced using a TPU whose elastic modulus was much smaller than that of PMMA having an elastic modulus in the range of 2.5 GPa to 5.5 GPa as the base member, the effect of improving scratch resistance hardly occurred. This is because the soft material TPU hardly acts as a supporting layer to prevent deformation (destruction) of the hard coating member due to external stress, so the external stress directly acts on the hard coating member to cause deformation, and the normal force (N) acts to generate the frictional force without limitation.

As such, when the stacked structure for a display cover window having improved scratch resistance using difference in elastic modulus according to the present disclosure has a configuration including the following, it exhibits excellent scratch resistance regardless of the surface hardness: a base member having an elastic modulus of 2.5 GPa to 5.5 GPa, a hard coating member disposed on the base member and having an elastic modulus of 0.546 times to 2.4 times the elastic modulus of the base member, and a damping member disposed beneath the base member and having an elastic modulus of 0.0000018 times to 0.02 times the elastic modulus of the base member.

In addition, although the preferred examples and experimental examples of the present disclosure have been illustrated and described hereinabove, the present disclosure is not limited to the above-mentioned specific examples and experimental examples, but may be variously modified or additionally implemented by those skilled in the art to which the present disclosure pertains without departing from the scope and spirit of the present disclosure as disclosed in the accompanying claims. These modified implementations or additional implementations should not be individually understood from the technical spirit or perspective of the present disclosure.

INDUSTRIAL APPLICABILITY

The present disclosure relates to a stacked structure for a display cover window having improved scratch resistance using a difference in elastic modulus and a method of manufacturing the same, and may be used in an industrial field related to a display.

The invention claimed is:

1. A stacked structure for a display cover window having improved scratch resistance using a difference in elastic modulus, comprising:

a base member having an elastic modulus of 2.5 GPa to 5.5 GPa;

a hard coating member disposed on the base member and having an elastic modulus of 0.546 times to 2.4 times the elastic modulus of the base member; and a damping member disposed beneath the base member and having an elastic modulus of 0.0000018 times to 0.02 times the elastic modulus of the base member, wherein the hard coating member has an elastic modulus of 3.0 GPa to 6.0 GPa, and the damping member has an elastic modulus of 0.01 GPa to 0.05 GPa, wherein the damping member has a thickness of 0.05 times to 0.36 times the thickness of the base member, and the damping member has a thickness of 10 μm to 20 μm, wherein the hard coating member includes 3 to 5 parts by weight of hexamethylene diisocyanate trimer (HDI-trimer), 20 to 24 parts by weight of pentaerythritol triacrylate (PETA), 10 to 15 parts by weight of nano-silica, 5 to 8 parts by weight of methyl methacrylate, 10 to 15 parts by weight of a curing agent, 0.1 to 0.5 parts by weight of a leveling agent, and 1 to 2 parts by weight of a photocuring agent, the base member includes poly (methyl methacrylate) (PMMA), and the damping member includes any one of a cured silicon-based adhesive layer or a cured acryl-based adhesive layer.

2. The stacked structure for a display cover window of claim 1, wherein the hard coating member has a thickness of 0.001 times to 0.198 times the thickness of the base member.

3. The stacked structure for a display cover window of claim 2, wherein the base member has a thickness of 101 μm to 1000 μm, the hard coating member has a thickness of 1 μm to 20 μm.

4. The stacked structure for a display cover window of claim 3, wherein the base member include:

a first base member having a thickness of 45 μm to 350 μm or less, an auxiliary damping member disposed beneath the first base member and having a thickness of 11 μm to 300 μm or less; and a second base member disposed beneath the auxiliary damping member and having a thickness of 45 μm to 350 μm or less.

5. A method of manufacturing a stacked structure for a display cover window having improved scratch resistance using a difference in elastic modulus, comprising: preparing a base member having an elastic modulus of 2.5 GPa to 5.5 GPa and a thickness of 101 μm to 1000 μm and made of poly (methyl methacrylate) (PMMA) materials; preparing a hard coating solution by dissolving a solid component containing 3 to 5 parts by weight of hexamethylene diisocyanate trimer (HDI-trimer), 20 to 24 parts by weight of pentaerythritol triacrylate (PETA), 10 to 15 parts by weight of nano-silica, 5 to 8 parts by weight of methyl methacrylate, 10 to 15 parts by weight of a curing agent, 0.1 to 0.5 parts by weight of a leveling agent, and 1 to 2 parts by weight of a photocuring agent in a solvent component containing 8 to 12 parts by weight of methyl cellosolve, 2 to 4 parts by weight of butyl alcohol, and 25 to 27 parts by weight of 1-methoxy-2-propanol; forming a hard coating member having an elastic modulus of 0.546 times to 2.4 times the elastic modulus of the base member and having a thickness of 0.001 times to 0.198 times the thickness of the base member by applying the hard coating solution to an upper portion of the base member, heat-drying the hard coating solution to remove the solvent, and photocuring the hard coating solution; and forming a damping member having an elastic modulus of 0.0000018 times to 0.02 times the elastic modulus of the base member and a thickness of 0.05 times to 0.36 times the thickness of the base member by applying a silicon-based adhesive layer or an acryl-based adhesive layer to a lower portion of the base member and curing the silicon-based adhesive layer or the acryl-based adhesive layer, wherein the hard coating member has an elastic modulus of 3.0 GPa to 6.0 GPa, and the damping member has an elastic modulus of 0.01 GPa to 0.05 GPa, and wherein the damping member has a thickness of 10 μm to 20 μm.

6. The method of manufacturing a stacked structure for a display cover window of claim 5, wherein the forming of the hard coating member is applying the hard coating solution to the upper portion of the base member, heat-drying the hard coating solution at 80° C. to 90° C. for 30 seconds to 90 seconds to remove the solvent, and photocuring the hard coating solution with an amount of light of 300 mJ to 4 mJ, and the forming of the damping member is applying the silicon-based adhesive layer or the acryl-based adhesive layer to the lower portion of the base member, primarily heat-curing the silicon-based adhesive layer or the acryl-based adhesive layer at 110° C. to 130° C. for 90 to 150 seconds, and secondarily heat-curing the silicon-based adhesive layer or the acryl-based adhesive layer at 150° C. to 170° C. for 90 to 150 seconds.

* * * * *